(12) United States Patent
Zhihua et al.

(10) Patent No.: US 10,284,316 B2
(45) Date of Patent: May 7, 2019

(54) METHOD FOR PREDICTING INDOOR THREE-DIMENSIONAL SPACE SIGNAL FIELD STRENGTH USING AN OUTDOOR-TO-INDOOR PROPAGATION MODEL

(71) Applicant: Ranplan Wireless Network Design Limited, Cambridge Cambridgeshire (GB)

(72) Inventors: Lai Zhihua, Cambridge (GB); Xia Bing, Hertfordshire (GB)

(73) Assignee: Ranplan Wireless Networks Design Limited, Cambridge Cambridgeshire (GB)

( * ) Notice: Subject to any disclaimer, the term of this patent is extended or adjusted under 35 U.S.C. 154(b) by 0 days.

(21) Appl. No.: 15/522,735

(22) PCT Filed: Oct. 27, 2015

(86) PCT No.: PCT/GB2015/053223
§ 371 (c)(1),
(2) Date: Apr. 27, 2017

(87) PCT Pub. No.: WO2016/067017
PCT Pub. Date: May 6, 2016

(65) Prior Publication Data
US 2017/0338901 A1  Nov. 23, 2017

(30) Foreign Application Priority Data
Oct. 27, 2014 (CN) .......................... 2014 1 0583520

(51) Int. Cl.
*H04B 17/391* (2015.01)
(52) U.S. Cl.
CPC ..... *H04B 17/3912* (2015.01); *H04B 17/3913* (2015.01)

(58) Field of Classification Search
CPC ............ H04B 17/3913; H04B 17/3912; H04B 17/318; H04B 1/3822
(Continued)

(56) References Cited

FOREIGN PATENT DOCUMENTS

| EP | 0 944 968 A2 | 9/1999 |
|---|---|---|
| WO | WO-98/31112 A2 | 7/1998 |
| WO | WO-98/31112 A3 | 9/1998 |

OTHER PUBLICATIONS

International Search Report issued in International Application No. PCT/GB2015/053223, dated Dec. 15, 2015 (Dec. 15, 2015). 4 pages.

(Continued)

*Primary Examiner* — Shaima Q Aminzay
(74) *Attorney, Agent, or Firm* — Edward D. Grieff; Mintz, Levin, Cohn, Ferris, Glovsky and Popeo, P.C.

(57) ABSTRACT

The present invention relates to a method for predicting indoor three-dimensional space signal field strength by an outdoor-to-indoor propagation model, which comprises the steps of: establishing a three-dimensional space scene model from a transmitting base station to a target building; predicting space field strength of an outer envelope of the target building according to an extended COST-231-Walfisch-Ikegami propagation model; generating, on the outer envelope of the target building, a series of out-door-to-indoor virtual rays in accordance with a certain resolution; simulating a propagation procedure of the virtual rays using a ray tracing propagation model algorithm, to predict three-dimensional space signal field strength in the target building. In the present invention, an extended COST231-Walfisch-Ikegami propagation model is adopted for the transmitting base station and the outdoor region of the target building, while a ray tracing propagation model algorithm is adopted for the indoor region of the target building, which effectively combines an outdoor empirical propagation model and an (Continued)

indoor deterministic propagation model, so that a good equilibrium is achieved between calculation efficiency and calculation accuracy, and the algorithm has a strong engineering applicability.

3 Claims, 3 Drawing Sheets

(58) Field of Classification Search
 USPC .................................................... 455/67.11
 See application file for complete search history.

(56) References Cited

OTHER PUBLICATIONS

Tila, F., et. al. "2 GHz Propagation and Diversity Evaluation for In-Building Communications up to 4 MHz using High Altitude Platforms (HAP)". *IEEE 54th Vehicular Technology Conference*, Oct. 7-11, 2001, Atlantic City, New Jersey, IEEE. (Oct. 7, 2001) vol. 1 (2001):pp. 121-125.
*COST Action 231: Digital Mobile Radio Towards Future Generation Systems. Final Report.* European Commission, 1999, pp. 5-9; 134-140; 183-185.

METHOD FOR PREDICTING INDOOR THREE-DIMENSIONAL SPACE SIGNAL FIELD STRENGTH USING AN OUTDOOR-TO-INDOOR PROPAGATION MODEL

CROSS-REFERENCES TO RELATED APPLICATIONS

This application is a national stage entry, filed under 35 U.S.C. § 371, of International Application No. PCT/GB2015/053223, filed on Oct. 27, 2015, and claims the benefit of and priority to Chinese Patent Application No. 201410583520.X, filed Oct. 27, 2014, the entire contents of each are hereby incorporated herein by reference in their entireties and for all purposes.

FIELD OF THE INVENTION

The present invention relates to a method for predicting indoor three-dimensional space signal field strength using an outdoor-to-indoor propagation model, which belongs to the technical field of electromagnetic wave propagation prediction in mobile communication.

BACKGROUND OF THE INVENTION

Wireless propagation models are a group of mathematical expressions, charts or algorithms for predicting radio propagation characteristics in a given environment. A propagation model may be either an empirical model (also referred to as a statistic model) or a theoretical model (also referred to as a deterministic model), or a combination of both. The empirical model has high calculation efficiency but low calculation accuracy, and thus is often used for wireless signal prediction of a large outdoor scene. The theoretical model has high calculation accuracy but low calculation efficiency, and thus is often used for wireless signal prediction of an indoor scene.

With wide applications of mobile Internet services, mobile data traffic presents an explosive growth. According to investigation of the Japanese DoCoMo company, 80% of mobile data services occur indoors, establishment of indoor wireless networks has become the key that mobile operators satisfy the demand of mobile data services and improve users' satisfaction, so that a large number of indoor coverage networks in various of forms such as indoor distributed systems, repeaters, remote base stations, mini base stations and the like are born at the right moment, and these indoor coverage networks and an outdoor macro base station collectively form a seamless mobile communication network. However, while the establishment of indoor coverage networks satisfies the demand of indoor services, it also brings a series of problems among which the most prominent one is that interference between indoor and outdoor networks becomes increasingly serious, including leakage of an indoor signal to the outdoor, and interference of an outdoor base station signal to the indoor. In order to solve interference between indoor and outdoor networks, indoor and outdoor united networks planning and optimization has become the key point of future network planning and establishment by the mobile operators. Indoor and outdoor united simulation is the premise of indoor and outdoor united planning, while an indoor and outdoor united propagation model algorithm is the premise of performing the indoor and outdoor united simulation. However, there are mainly two types of wireless propagation models in the current industry, one of which is suitable for accurate simulation of a small indoor scene, and the other one is suitable for rough simulation of a large outdoor scene. Document [1] provides an outdoor-to-indoor propagation model, for which a ray tracing propagation model algorithm is adopted for the outdoor, and a time domain finite difference propagation model is adopted for the indoor. A deterministic propagation model is adopted for both the indoor and outdoor, which needs a large amount of calculation and has a low engineering availability. There is an absence of an efficient propagation model that can be applied for both indoor and outdoor united scenes.

In general, at present one technical problem that needs to be solved urgently by persons skilled in the art is to seek for a rapid and efficient outdoor-to-indoor propagation model algorithm to rapidly and accurately predict signal field strength generated in the outdoor-to-indoor three-dimensional space.

SUMMARY OF THE INVENTION

Aiming at the defects of existing technologies, the present invention provides a method for predicting indoor three-dimensional space signal field strength using an outdoor-to-indoor propagation model.

Outline of the Invention

A method for predicting indoor three-dimensional space signal field strength using an outdoor-to-indoor propagation model comprises steps of: establishing a three-dimensional space scene model from a transmitting base station to a target building; predicting space field strength of an outer envelope of the target building according to an extended COST-231-Walfisch-Ikegami propagation model; generating, on the outer envelope of the target building, a series of outdoor-to-indoor virtual rays in accordance with a certain resolution; and simulating a propagation procedure of the virtual rays using a ray tracing propagation model algorithm, and predicting three-dimensional space signal field strength within the target building.

Details of the Invention

A method for predicting indoor three-dimensional space signal field strength using an outdoor-to-indoor propagation model comprises specific steps of:

step (1): establishing a three-dimensional space scene model from a transmitting base station to a target building, the modeling of the three-dimensional space scene model comprising: a three-dimensional scene model of outdoor buildings and streets and an indoor three-dimensional scene model of a target building, and the establishing comprising following steps (1-1) to (1-4):

step (1-1): importing GIS map information using existing modeling technology according to given GIS map information to establish a three-dimensional scene model from a transmitting base station to a prediction region space, wherein the three-dimensional scene model comprises building vector information, terrain and landform information, and the building vector information is a building outer envelope model;

step (1-2): importing a drawing in CAD format using the existing modeling technology according to a given architectural drawing in CAD format of the target building to establish an indoor three-dimensional scene model of the target building, comprising size, location, structure of the target building and building material within the target building, and wireless propagation loss parameter data of the building material;

step (1-3): according to specific location information of the target building, aligning an outer envelope model of the target building in the outdoor three-dimensional scene model in the step (1-1) with a detailed indoor building model, the aligning comprising specific steps of translating and rotating the indoor building model, so that the same building has consistent locations in a coordinate system of the indoor building model and a coordinate system of an outdoor building model;

step (1-4): filtering out invalid building and street model information from the outdoor building model in the step (1-1) to obtain three-dimensional building model and street information of valid buildings within the scope of the transmitting base station and the target building, wherein the valid buildings are all buildings containing within a first Fresnel circle between a receiving point at one meter high outside the target building and the transmitting base station; the radius r of the first Fresnel circle is calculated by $$r = \sqrt{\frac{\lambda d_1 d_2}{d}},$$

wherein $\lambda$ is the wavelength of an electromagnetic wave, d represents a distance from the transmitting base station to a receiving point, S represents an infinite plane that is perpendicular to a line connecting a transmitting point and the receiving point, $d_1$ and $d_2$ represent a distance between the transmitting base station and the plane S and a distance between the receiving point and the plane S respectively; the three-dimensional building model information includes building outer envelope information, building height information hoof, and building geographical location information; and the street information includes street width information w and street geographical location information;

step (2): predicting space field strength of an outer envelope of the target building according to an extended COST-231-Walfisch-Ikegami propagation model, comprising following steps (2-1) to (2-6):

step (2-1): performing on-site measurement in accordance with a fixed resolution at the periphery of the target building, and recording measurement data that an antenna signal of the transmitting base station reaches an outer envelope located one meter high from the ground at the periphery of the target building, the outer envelope of the target building only including a side of the target building that is close to the transmitting base station, but not including a side of the target building that is far away from the transmitting base station; wherein, measurement data of one receiving point includes location information and wireless signal strength information of the receiving point, which is represented as (x, y, z, $M_{rx}$), wherein x is longitude information of the receiving point, y is latitude information of the receiving point, z is height information of the receiving point, and $M_{rx}$ is reception signal strength information of the receiving point;

step (2-2): acquiring a vertical section between the transmitting base station and one receiving point of the outer envelope of the target building that is located one meter high from the ground in the step (2-1), and acquiring therefrom key parameters of the COST-231-Walfisch-Ikegami propagation model, wherein the key parameters include an average roof height $h_{roof}$, an average street width w, an average distance b between buildings, a height $h_{tx}$ of the base station, a height $h_{rx}$ of the receiving point, a transmitting power W of the base station, a frequency f of a transmitting signal of the base station, a distance d between the base station and the reception pint, and an included angle $\varphi$ between an incident direction of a direct wave of the base station and a direction of a street to which a testing point belongs;

calculating reception signal strength $T_{rx}$ of the receiving point according to a calculation formula of the COST-231-Walfisch-Ikegami propagation model; a method for calculating the reception signal strength of the receiving point using the COST-231-Walfisch-Ikegami propagation model comprises following steps (2-2-1) to (2-2-4):

step (2-2-1): calculating propagation losses of line-of-sight propagation and non line-of-sight propagation between the base station and the receiving point respectively, wherein the propagation loss $L_{blos}$ of the line-of-sight propagation is calculated in accordance with the step (2-2-2) and the propagation loss $L_{bNlos}$ of the non line-of-sight propagation is calculated in accordance with the step (2-2-3), therefore a propagation loss $L_b$ is represented as the following formula:

$$L_b = \begin{cases} L_{blos}, \text{ when there is line-of-sight propagation from a transmitting point to a receiving point} \\ L_{bNlos}, \text{ when there is non line-of-sight propagation from a transmitting point to a receiving point} \end{cases};$$

step (2-2-2): calculating a propagation loss according to the formula $L_{blos}=42.6+26\lg d+20\lg f$ when there is line-of-sight propagation between the base station and the receiving point, wherein $L_{blos}$ is a propagation loss of the line-of-sight propagation;

step (2-2-3): calculating a propagation loss according to the formula $L_{bNlos}=L_{bs}+L_{rts}+L_{msd}$ when there is non line-of-sight propagation between the base station and the receiving point, wherein $L_{bs}$ is a propagation loss of a free space, $L_{rts}$ is a diffraction and scattering loss from the roof to the street, $L_{msd}$ is a diffraction loss of multiple barriers, and a specific method of calculating $L_{bs}$, $L_{rts}$, and $L_{msd}$ comprises following steps (2-2-3-1) to (2-2-3-3):

step (2-2-3-1): in the step (2-2-3), $L_{bs}$ is calculated by the formula $L_{bs}=32.45+20\lg d+20\lg f$;

step (2-2-3-2): in the step (2-2-3), $L_{rts}$ is calculated by the following formula:

$$L_{rts} = \begin{cases} -16.9 - 10\lg w + 10\lg f + 20\lg(h_{roof} - h_{rx}) + L_{ori}, \text{ when } h_{roof} > h_{rx} \\ 0, \quad \text{when } L_{rts} < 0 \end{cases}$$

wherein, $$L_{ori} = \begin{cases} -10 + 0.354\phi, & 0 \le \phi < 35 \\ 2.5 + 0.075 \times (\phi - 35), & 35 \le \phi < 55 \\ 4.0 - 0.114 \times (\phi - 35), & 55 \le \phi < 90 \end{cases};$$

step (2-2-3-3): in the step (2-2-3), $L_{msd}$ is calculated by the following formula:

$$L_{msd} = \begin{cases} L_{bsh} + K_a + K_d \lg d + K_f \lg f - 9\lg b \\ 0, \text{ when } L_{msd} < 0 \end{cases}$$

wherein, $$L_{bsh} = \begin{cases} -18lg(1 + h_{tx} - h_{roof}), & h_{tx} > h_{roof} \\ 0, & \text{when } h_{tx} \leq h_{roof} \end{cases}$$

$$K_a = \begin{cases} 54, & h_{tx} > h_{roof} \\ 54 - 0.8 \times (h_{tx} - h_{roof}), & d \geq 0.5 \text{ km and } h_{tx} \leq h_{roof} \\ 54 - 0.8 \times (h_{tx} - h_{roof}) \times \left(\frac{d}{0.5}\right), & d < 0.5 \text{ km and } h_{tx} \leq h_{roof} \end{cases}$$

$$K_d = \begin{cases} 18, & h_{tx} > h_{roof} \\ 18 - 15\left(\frac{h_{tx} - h_{roof}}{h_{roof} - h_{rx}}\right), & h_{tx} \leq h_{roof} \end{cases}$$

$$K_f = -4 + \begin{cases} 0.7 \times \left(\frac{f}{925} - 1\right), & \text{for a medium-sized city and the center of a suburb having trees of a medium density} \\ 1.5 \times \left(\frac{f}{925} - 1\right), & \text{for the center of a big city} \end{cases}$$

step (2-2-4): reception signal field strength when there is line-of-sight propagation between the transmitting point and the receiving point is $T_{los}=W-L_{blos}$, and reception signal field strength when there is non line-of-sight propagation between the transmitting point and the receiving point is $T_{Nlos}=W-L_{bNlos}$, therefore signal field strength of the receiving point is represented as:

$$T_{rx} = \begin{cases} W - L_{blos} = T_{los}, & \text{when there is line-of-sight propagation from a transmitting point to a receiving point} \\ W - L_{bNlos} = T_{Nlos}, & \text{when there is non line-of-sight propagation from a transmitting point to a receiving point} \end{cases};$$

step (2-3): calculating an error between a measured value and a predicted value $\Delta=M_{rx}-T_{rx}$ according to the actually measured field strength $M_{rx}$ and a predicted field strength $T_{rx}$ of the testing point, to correct the calculation formula of the COST-231-Walfisch-Ikegami propagation model of the measurement point:

wherein, a corrected value between the actually measured field strength $M_{rx}$ and the predicted field strength $T_{rx}$ includes a corrected value $\Delta_{los}$ of line-of-sight propagation and a corrected value $\Delta_{Nlos}$ of non line-of-sight propagation:

$$\Delta = M_{rx} - T_{rx} = \begin{cases} \Delta_{los} = M_{rx} - T_{los}, & \text{when there is line-of-sight propagation from a transmitting point to a receiving point} \\ \Delta_{Nlos} = M_{rx} - T_{Nlos}, & \text{when there is non line-of-sight propagation from a transmitting point to a receiving point} \end{cases};$$

step (2-4): acquiring a vertical section between the transmitting base station and the receiving point of an extended height $h_{rx}'$ of the measurement point, wherein the extend height $h_{rx}'$ is consistent with a height of a predicted floor of the target building, and filtering out therefrom buildings outside the first Fresnel circle between the transmitting point and the receiving point, to re-acquire the key parameters of the COST-231-Walfisch-Ikegami propagation model, and calculating the reception signal strength of the extend height $h_{rx}'$ of the measurement point according to the corrected COST-231-Walfisch-Ikegami propagation model; the calculating the reception signal strength of the extend height $h_{rx}'$ specifically comprises following steps (2-4-1) to (2-4-2):

step (2-4-1): acquiring a vertical section between the transmitting base station and the extended height $h_{rx}'$ of the measuring point, and filtering out therefrom buildings outside the first Fresnel circle between the transmitting point and the receiving point, the calculation method of the radius r of the first Fresnel circle is the same with that of the step (1-4), $$r = \sqrt{\frac{\lambda d_1 d_2}{d}},$$

wherein d represents a distance from the transmitting base station to the receiving point, S represents an infinite plane that is perpendicular to the line connecting the transmitting point and the receiving point, $d_1$ and $d_2$ represent distances between the transmitting base station and the plane S and between the receiving point and the plane S respectively, a first Fresnel radius is a radius of a circle that is formed by intersecting the plane S and a Fresnel ellipsoid;

step (2-4-2): re-acquiring the key parameters of the COST-231-Walfisch-Ikegami propagation model according to three-dimensional building and street information that is filtered out of the first Fresnel circle, calculating field strength $T_{rx}'$ of the receiving point using the formula stated in the step (2-2), and calculating a correction parameter A using the step (2-3) to correct the signal field strength of the receiving point, and the corrected field strength of the receiving point may be represented as $T_{rx}''=T_{rx}'+\Delta$;

step (2-5): changing the height $h_{rx}'$ within a height range of the predicted floor, repeating the step (2-4), and calculating reception signal strength of the receiving point at a target floor using the corrected COST-231-Walfisch-Ikegami propagation model:

applying a mirror principle extended model algorithm when the height of the predicted floor $h_{rx}'>h_{tx}$ and there is non line-of-sight propagation, and replacing the actual height $h_{rx}'$ with a mirror height $h_{rx}''$ when the COST-231-Walfishch-Ikegami propagation model formula is applied, wherein the mirror height conforms to the formula $$h_{rx}'' = \begin{cases} 2h_{tx} - h_{rx}', & \text{when } h_{rx}' > h_{tx} \\ h_{rx}', & \text{when } h_{rx}' \leq h_{tx} \end{cases};$$

step (2-6): changing a position of the receiving point, repeating the steps (2-2) to (2-5), calculating reception signal strength of all prediction points at the outside of the target floor, thereby obtaining predicted signal field strength on an outer envelope of the target floor of the target building;

step (3): generating, on the outer envelope of the target building, a series of outdoor-to-indoor virtual rays in accordance with a fixed resolution:

the resolution of the virtual rays is the same with that of the testing point in the step (2-1), in order to improve indoor calculation accuracy and the resolution of the rays, more virtual rays may be generated in accordance with a principle of linear interpolation, because in the actual engineering application, a resolution for outdoor calculation is sometimes not the same with a resolution for indoor calculation, for example, the resolution for the outdoor calculation is generally less than 5 m, while there is a demand that the resolution for the indoor calculation is larger than 0.5 m. The signal strengths of the virtual rays are the same with that of the receiving point; the direction of the virtual rays is consistent with that of a line connecting the transmitting base station and a point generated by the virtual rays; the outer envelope of the target building to generate the virtual rays only includes a side of the target building that is close to the transmitting base station because the virtual rays here pass through outer wall of the target building into the target building to continue to spread, but does not include a side of the target building that is back on to the transmitting base station because the virtual rays here are in a direction departing from the target building, virtual rays that are received on the back of the building are virtual rays that are reflected from an opposite building, the strengths of which are generally much smaller than that of virtual rays received on the front side because these virtual rays need to overcome a reflection loss of the opposite building besides a distance loss generated due to a further distance from the transmitting base station.

step (4): tracing a propagation procedure of the virtual rays using a ray tracing propagation model algorithm, and predicting three-dimensional space signal field strength within the target building:

predicting signal strength of an outdoor transmitting antenna received at one receiving point i within the target building using the ray tracing propagation model algorithm comprises following specific steps (4-1) to (4-6):

step (4-1): determining all propagation paths through which the virtual rays reach the receiving point i indoor according to propagation directions of the virtual rays and locations of outdoor receiving points generated in the step (3): N is the total number of the propagation paths through which the virtual rays reach the receiving point i, according to the calculation result in the step (2), initial field strengths for N virtual rays are respectively denoted as $T_{rx}^k$ (1≤k≤N), a transmitting power of an outdoor base station is denoted as W, and outdoor propagation losses of the N virtual rays that reach the outer envelope of the target building from the base station are respectively denoted as $L_{out}^k = W - T_{rx}^k$ (1≤k≤N);

step (4-2): calculating a propagation loss of each propagation path in an indoor free space, wherein a loss value of the k-th path in the free space is $L_p(f, d_k)$ (1≤k≤N), f is a signal frequency (MHz), $d_k$ is a distance (km) that the k-th path transfers in the free space; without considering transmission, reflection and diffraction phenomena, the loss value (dB) of the k-th path in the free space is calculated by the following formula:

$$L_p(f,d_k)=20 \log 10(f)+20 \log 10(d_k)+32.45;$$

step (4-3): calculating a loss of each propagation path that is influenced by building materials, wherein $L_{MAT}(f)$ is the sum of declination of transmission, reflection and diffraction on the k-th path caused by the building materials; T is the total number of all building materials in the target building, the j-th kind of material is represented as $M_j$ (1≤j≤T), δt, δd, and δr are relation coefficients showing whether a wireless signal on the k-th path has transmission, diffraction and reflection relations with the building material respectively, $$\delta t = \begin{cases} 0, \text{ when there is no transmission for the material } M_j \\ 1, \text{ when there is transmission for the material } M_j \end{cases},$$

$$\delta d = \begin{cases} 0, \text{ when there is no diffraction for the material } M_j \\ 1, \text{ when there is diffraction for the material } M_j \end{cases},$$

$$\delta r = \begin{cases} 0, \text{ when there is no reflection for the material } M_j \\ 1, \text{ when there is reflection for the material } M_j \end{cases},$$

$L_t(f, M_j)$, $L_d(f, M_j)$, and $L_r(f, M_j)$ are transmission, diffraction and reflection loss parameters of frequencies corresponding to the material $M_j$ found in a building material wireless propagation loss parameter database when the frequency of the wireless signal is f, respectively; then the sum $L_{MAT}(f)$ of declination of transmission, reflection and diffraction on the k-th path caused by the building material is calculated by the following formula:

$$L_{MAT}(f) = \sum_{j=1}^{T} (\delta t * L_t(f, M_j) + \delta d * L_d(f, M_j) + \delta r * L_r(f, M_j));$$

step (4-4): calculating a propagation loss $L(f, d_k)$ of each virtual ray on the propagation path using the following formula:

$$L(f,d_k)=L_{out}^k+L_p(f,d_k)+L_{MAT}(f);$$

step (4-5): calculating the sum of losses of propagation paths of N rays reaching the i-th point as PL (dB); because the energy for the propagation path of each ray is of a linear relationship, the losses of a plurality of propagation paths are calculated by firstly superpositioning the energy (mW) of each ray, taking the average value, and then converting the energy value into a path loss value; said PL is calculated by the following formula:

$$PL = 10 \lg \left( \frac{1}{N} \sum_{k=1}^{N} \left( 10^{\frac{L(f,d_k)}{10}} \right) \right);$$

step (4-6): calculating wireless signal strength of the receiving point i, assuming that $P_i$ is the signal strength (dBm) of the i-th receiving point and W is transmitting power (dBm) of a wireless signal transmitting antenna, then the signal strength $P_i$ of the i-th receiving point is calculated by the following formula:

$$P_i = W - PL;$$

step (4-7): selecting other receiving points within the building, and repeating the steps (4-1) to (4-6) to calculate signal strength of each of these receiving points, thereby completing prediction of signal field strength of the indoor three-dimensional space of the target floor of the target building.

Beneficial Effects of the Invention

1. In the present invention, an extended COST231-Walfisch-Ikegami propagation model is adopted for the transmitting base station and the outdoor region of the target building, while a ray tracing propagation model algorithm is adopted for the indoor region of the target building, which effectively combines an outdoor empirical propagation model and an indoor deterministic propagation model, so that a good equilibrium is achieved between calculation efficiency and calculation accuracy, and the algorithm has a strong engineering applicability.

2. In the present invention, an experience-type COST231-Walfisch-Ikegami propagation model is adopted for outdoor regions, and a deterministic ray tracing propagation model is adopted for indoor regions, the calculation for the outdoor propagation model depends on the information of outdoor three-dimensional buildings and streets and does not need detailed structure information inside a building, therefore, outdoor three-dimensional modeling only needs to import an electronic map in GIS format, the calculation for the indoor propagation model depends on detailed structure information inside a building, and thus it is only necessary to perform an operation of importing a building drawing in CAD format for the target building, to complete the modeling of the target building. The three-dimensional modeling operation has a high validity.

3. In the present invention, at the time of generating virtual rays, according to the requirement on indoor simulation fineness, it is possible to perform a linear difference on calculation resolution of the outdoor propagation model and to flexibly control resolution of indoor and outdoor simulation.

DETAILED DESCRIPTION OF EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The invention is further explained below with reference to accompanying figures and embodiments, but it is not limited thereto.

Embodiments

As shown in FIGS. 1-6,
the field strength generated by an outdoor base station antenna within its tenth floor of a building in a center region of a big city is predicted by using a method for predicting indoor three-dimensional space signal field strength by an outdoor-to-indoor propagation model according to the invention, wherein the building is 30 m high.

Figure 1:
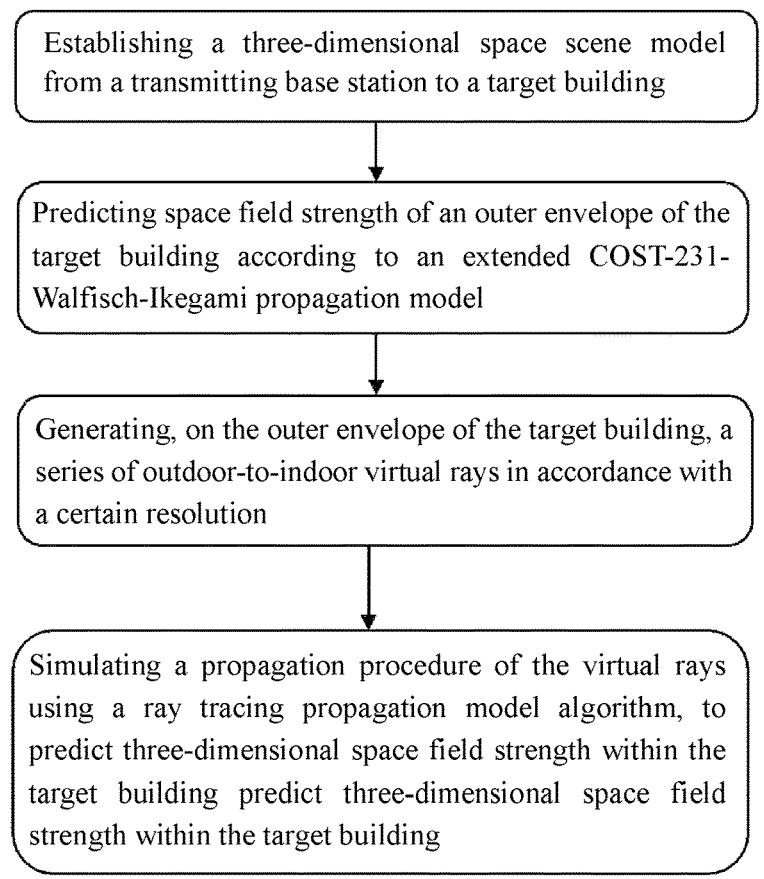
FIG. 1 is a flowchart of a method for predicting indoor three-dimensional space signal field strength using an outdoor-to-indoor propagation model according to the invention.
Figure 2:
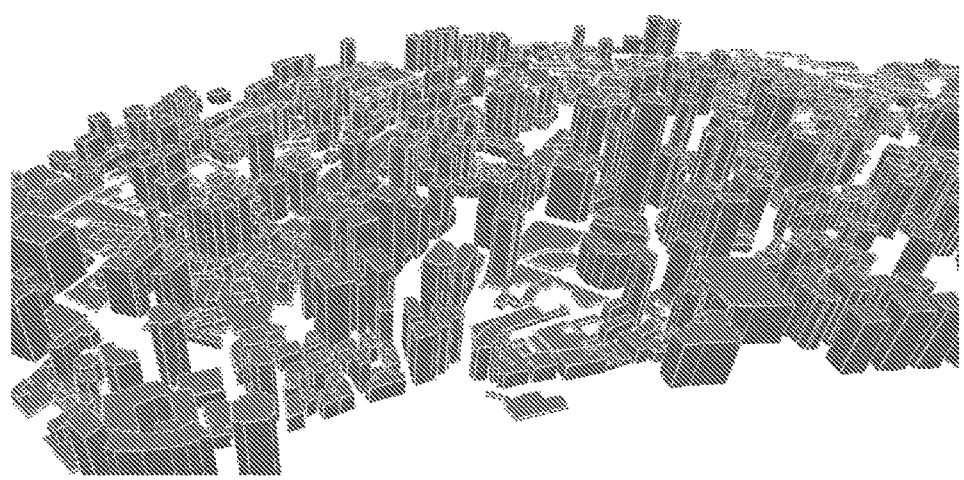
FIG. 2 is an effect diagram of outdoor three-dimensional modeling according to the invention.
Figure 3:
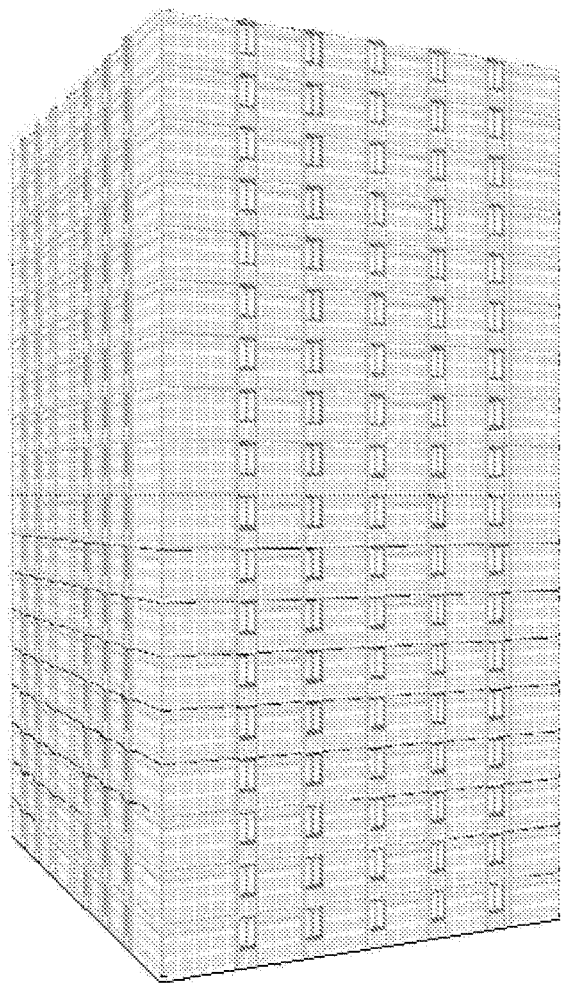
FIG. 3 is an effect diagram of three-dimensional modeling of a target building according to the invention.

A step (1): establishing a three-dimensional space scene model from a transmitting base station to a target building according to a given GIS map of a region in a city that contains the predicted target building and a building drawing in CAD format of the target building, comprises the following three steps:

step (1-1): importing GIS map information according to given 5 m-accuracy GIS map information and using existing modeling technology to establish a three-dimensional scene model from the transmitting base station to a predicted region space, wherein the three-dimensional scene model comprises building vector information, terrain and landform information, and the building vector information is a building outer envelope model; as shown in FIG. 2.

step (1-2): importing a drawing in CAD format according to a given architectural drawing in CAD format of the target building and using the existing modeling technology to establish an indoor three-dimensional scene model of the target building, which comprises size, location, structure of the target building and building material within the target building, and wireless propagation loss parameter data of the building material, as shown in FIG. 3.

step (1-3): according to the specific location information of the target building, aligning an outer envelope model of the target building in FIG. 1 with a detailed indoor building model in FIG. 2, the aligning comprises specific steps of translating and rotating the indoor building model, so that the same building has consistent location in a coordinate system of the indoor building model and a coordinate system of an outdoor building model.

step (1-4): filtering out invalid building and street model information from the outdoor building model shown in FIG. 1 to obtain three-dimensional building model and street information of valid buildings within the scope of the transmitting base station and the target building, wherein the valid buildings are all buildings containing within a first Fresnel circle between a receiving point at one meter high outside the target building and the transmitting base station. The radius r of the first Fresnel circle is calculated by $$r = \sqrt{\frac{\lambda d_1 d_2}{d}},$$

wherein d represents a distance from the transmitting base station to a receiving point, d=600 m, S represents an infinite plane that is perpendicular to a line connecting a transmitting point and the receiving point, $d_1$ and $d_2$ represent a distance between the transmitting base station and the plane S and a distance between the receiving point and the plane S respectively, $d_1+d_2=600$ m, $\lambda$ is the wavelength of a electromagnetic wave, the frequency f of the electromagnetic wave is 2600 MHz, the propagation velocity of the electromagnetic wave is the velocity of light c, $\lambda=c/f=3/26$ m, a first Fresnel radius is the radius of a circle that is formed by intersecting the plane S and a Fresnel ellipsoid, therefore the Fresnel radius in the center of the ellipsoid is $$r = \sqrt{\frac{\lambda d_1 d_2}{d}} = \sqrt{\frac{3 \times 300 * 300}{26 \times 600}} = 4.16 \text{ m}.$$

Figure 4:
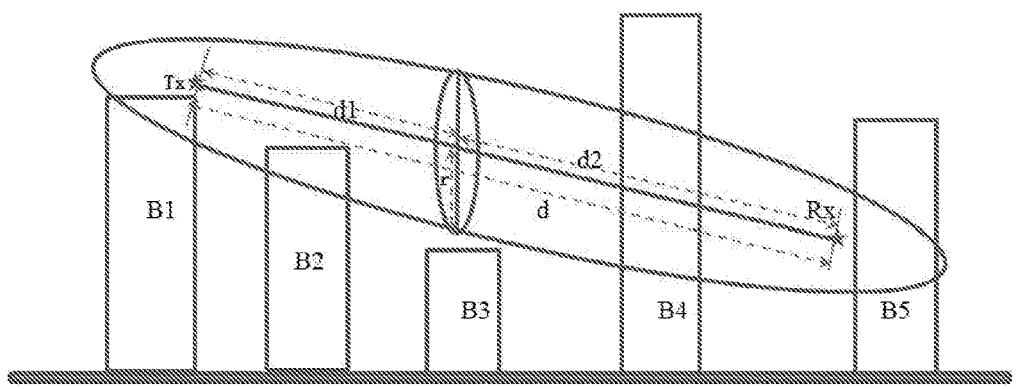
FIG. 4 shows model information of valid buildings and streets between a transmitting base station and the target building according to the invention.

The three-dimensional building model information includes building outer envelope information, building height information, and building geographical location information, as shown in FIG. 4.

A step (2): predicting space field strength of an outer envelope of the target building on its tenth floor according to an extended COST-231-Walfisch-Ikegami propagation model specifically comprises as follows:

step (2-1): performing on-site measurement in accordance with a resolution of 0.5 m at the periphery of the target building, and recording measurement data that an antenna signal of the transmitting base station reaches an outer envelope located one meter high from the ground at the periphery of the target building, the outer envelope of the target building only includes a side of the target building that is close to the transmitting base station, but does not include a side of the target building that is far away from the transmitting base station; wherein, measurement data of each receiving point includes location information and wireless signal strength information of the receiving point, which is represented as (x, y, z, $M_{rx}$), wherein x is longitude information, y is latitude information, z is height information, and $M_{rx}$ is reception signal strength information, $M_{rx}=-98.5$ dBm.

step (2-2): acquiring a vertical section between the transmitting base station and one receiving point of the outer envelope of the target building that is located one meter high from the ground in the step (2-1), and acquiring therefrom key parameters of the COST-231-Walfisch-Ikegami propagation model, wherein the key parameters include an average roof height $h_{roof}=30$ m, an average street width w=14 m, an average space between buildings b=100 m, the height of the base station $h_{tx}=39$, a height of the receiving point $h_{rx}=1$ m, and a transmitting power of the base station W=49.63 dBm, a frequency of a transmitting signal of the base station f=2600 MHz, a distance between the base station and the reception pint d=0.6 km, and an included angle between an incident direction of a direct wave of the base station and a direction of a street to which a testing point belongs φ=37.5°. The reception signal strength $T_{rx}$ of the receiving point is predicted according to the calculation formula of the COST-231-Walfisch-Ikegami propagation model.

(2-2-1) Propagation losses of line-of-sight propagation and non line-of-sight propagation between the base station and the receiving point are calculated respectively, wherein the propagation loss $L_{blos}$ of line-of-sight propagation is calculated in accordance with the step (2-2-2) and the propagation loss $L_{bNlos}$ of non line-of-sight propagation is calculated in accordance with the step (2-2-3), therefore a propagation loss $L_b$ may be represented as the following formula:

(2-2-2) If P is line-of-sight propagation, a propagation loss is calculated by the formula $L_{blos}=42.6+26\lg d+20\lg f=42.6+26\lg 0.6+20*1\lg 2600=105.13$ dB.

(2-2-3) If P is non line-of-sight propagation, a propagation loss is calculated according to the formula $L_{bNlos}=L_{bs}+L_{rts}+L_{msd}$, wherein $L_{bs}$ is a propagation loss of a free space, $L_{rts}$ is a diffraction and scattering loss from the roof to the street, $L_{msd}$ is a diffraction loss of multiple barriers, and $L_{bs}$, $L_{rts}$, and $L_{msd}$ are calculated by the following specific steps (2-2-3-1) to (2-2-3-3).

(2-2-3-1) $L_{bs}$ is calculated by the following formula:

$L_{bs}=32.45+20\lg d+20\lg f=32.45+20\lg 0.6+20\lg 2600=96.3$.

(2-2-3-2) $L_{rts}$ is calculated by the following formula:

$L_{rts}=-16.9-10\lg w-10\lg f-20\lg(h_{roof}-h_{rx})-L_{ori}$ $=-16.9-10\lg 14-10\lg 2600-20\lg(30-1)-L_{ori}$ wherein, $L_{ors}=2.5-0.075\times(\phi-35)=2.5-0.075\times(37.5-35)=2.64$ thus $L_{rts}=37.7$.

(2-2-3-3) $L_{msd}$ is calculated by the following formula:

$L_{msd}=L_{bsh}-K_a-K_d\lg d-K_f\lg f-9\lg b$ $=L_{bsh}-K_a-K_d\lg 0.6-K_f\lg 2600-9\lg 100$ wherein, $L_{bsh}=-18\lg(1-h_{tx}-h_{roof})=-18\lg(1-9)=-18$ $K_a=54$ $K_d=18$ $K_f = -4 + 1.5 \times \left(\dfrac{f}{925} - 1\right) = -4 + 1.5 \times \left(\dfrac{2600}{925} - 1\right) = -1.28$ thus $L_{msd}=-18-54-18\times\lg 0.6-1.28\times\lg 2600-9\times\lg 100=9.62$ $L_{bNlos}=L_{bs}-L_{rts}-L_{msd}=96.3-37.7-9.62=143.66$ (2-2-4) The signal field strength of the receiving point is calculated according to the following formula:

$$T_{rx} = \begin{cases} T_{los} = W - L_{blos} = -55.5 \text{ dBm, when there is line-of-sight} \\ \text{propagation from a transmitting point to a receiving point} \\ T_{Nlos} = W - L_{bNlos} = -94.03 \text{ dBm, when there is non line-of-sight} \\ \text{propagation from a transmitting point to a receiving point} \end{cases}$$

Step (2-3): calculating an error between a measured value and a predicted value $\Delta=M_{rx}-T_{rx}$ according to the actually measured field strength $M_{rx}$ and predicted field strength $T_{rx}$ of the testing point, to correct the calculation formula of the COST-231-Walfisch-Ikegami propagation model of the testing point.

$$\Delta = \begin{cases} \Delta_{los} = M_{rx} - T_{los} = -43 \text{ dBm, when there is line-of-sight} \\ \text{propagation from a transmitting point to a receiving point} \\ \Delta_{Nlos} = M_{rx} - T_{Nlos} = -4.47 \text{ dBm, when there is non line-of-sight} \\ \text{propagation from a transmitting point to a receiving point} \end{cases}$$

Step (2-4): acquiring a vertical section between the transmitting base station and the receiving point of an extended height of the testing point $h_{rx}'=30$ m, wherein the extend height $h_{rx}'$ is consistent with the height of a predicted floor of the target building, and filtering therefrom buildings outside the first Fresnel circle between the transmitting point and the receiving point; re-acquiring the key parameters of the COST-231-Walfisch-Ikegami propagation model after it is judged that there is still non line-of-sight propagation from the transmitting point to the receiving point, wherein the key parameters include an average roof height $h'_{roof}=38$ m, an average street width w'=21 m, an average distance between buildings b'=150 m, a height of the base station $M'_{tx}=39$ m, a transmitting power of the base station W'=49.63 dBm, a transmitting signal frequency of the base station f'=2600 MHz, a distance between the base station and the reception pint d'=0.599 km, and an included angle between an incident direction of a direct wave of the base station and a direction of a street to which a testing point belongs φ'=37.5°; calculating the reception signal strength −96.52 dBm of the extended height $h_{rx}'$ of the receiving point according to the corrected COST-231-Walfisch-Ikegami propagation model.

Step (2-5): changing the height $h_{rx}'$ within a height range (30 m-33 m) of the predicted floor into (30.5 m, 31 m, 31.5 m, 32 m, 32.5 m, 33 m), repeating the step (2-4), and calculating reception signal strength of the receiving point at the tenth floor using the corrected COST-231-Walfisch-Ikegami propagation model algorithm as (−95.96, −95.36, −94.72, −94.02, −93.27, −92.44) dBm.

Step (2-6): changing a position of the receiving point, repeating the steps (2-2) to (2-5), calculating reception signal strength of all prediction points at the outside of the tenth floor (30 m-33 m high from the ground), so as to obtain predicted signal field strength on the outer envelope of the tenth floor of the target building.

Figure 5:
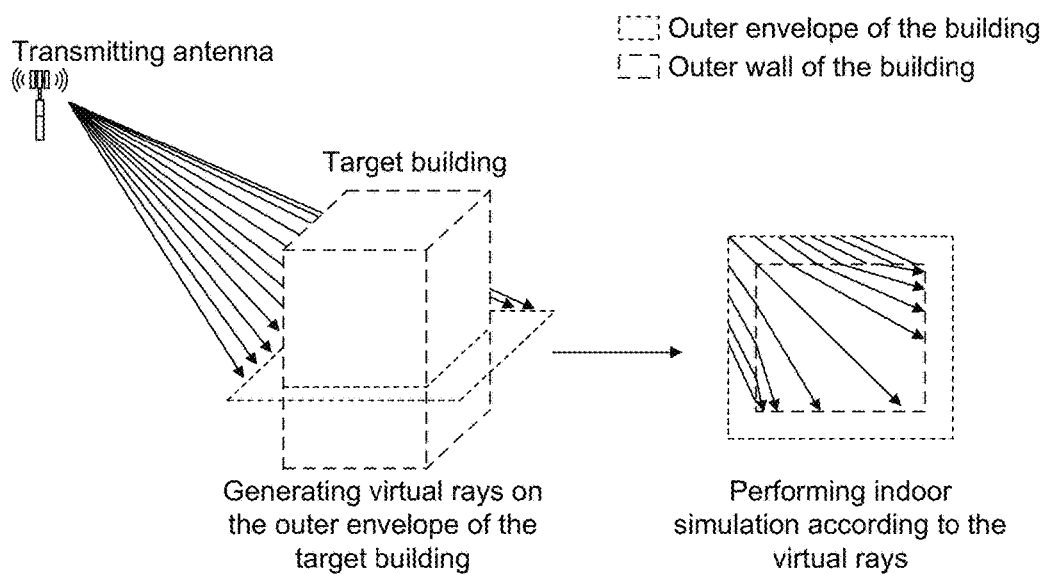
FIG. 5 is a diagram generated by virtual rays according to the invention.

A step (3): generating, on the outer envelope of the target building, a series of outdoor-to-indoor virtual rays in accordance with the resolution of 0.5 m, here an outdoor resolution is the same with an indoor resolution, and a linear difference is not considered. The signal strengths of the virtual rays are the same with that of the receiving point; the direction of the virtual rays is consistent with that of a line connecting the transmitting base station and a point generated by the virtual rays; the outer envelope of the target building to generate the virtual rays only includes a side of the target building that is close to the transmitting base station because the virtual rays here can pass through the outer wall of the target building into the target building to continue to spread, but does not include a side of the target building that is far away from the transmitting base station because the virtual rays here are in a direction departing from the target building. A procedure of generating virtual rays is as shown in FIG. 5.

Step (4): tracing a propagation procedure of the virtual rays using a ray tracing propagation model algorithm, and predicting three-dimensional space signal field strength within the target building. Predicting signal strength of an outdoor transmitting antenna received at a receiving point i within the target building using the ray tracing propagation model algorithm comprises following specific steps (4-1) to (4-6):

(4-1): determining totally two propagation paths a, b through which the virtual rays reach indoor receiving point i according to propagation directions of the virtual rays and locations of the outdoor receiving point generated in the step (3) N=2, (1≤k≤2); according to the calculation result in the step (2), initial field strengths for the two virtual rays are denoted as $T_{rx}^1$=−80.38 dBm and $T_{rx}^2$=−85.26 dBm respectively. It is known that a transmitting power of an outdoor base station is W=49.63 dBm, outdoor propagation losses of the two virtual rays a, b that reach the outer envelope of the target building from the base station $L_{out}^k = W - T_{rx}^k$ are denoted as $L_{out}^1$=130.01 dB and $L_{out}^2$=134.89 dB respectively.

(4-2): calculating a propagation loss of each propagation path in free space, wherein the loss value of the k-th path in the free space is $L_p(f, d_k)$ (1≤k≤2), the signal frequency f=2600 MHz, $d_k$ is a distance (km) that the k-th path transfers in the free space, wherein the distance of the ray a is $d_1$=6×10$^{-3}$ km, the distance of the ray b is $d_2$=7.5×10$^{-2}$ km, without considering transmission, reflection and diffraction phenomena, the loss values (dB) of the two paths in the free space are calculated according to the formula $L_p(f, d_k)$=20 log 10(f)+20 log 10($d_k$)+32.45.

$$L_p(f,d_1)=56.31 \text{ dB}, L_p(f,d_2)=58.25 \text{ dB}.$$

(4-3): calculating a loss of each propagation path that is influenced by building materials, wherein $L_{MAT}(f)$ is the sum of declination of transmission, reflection and diffraction on the k-th path caused by the building materials; T is the total number of all building materials in the target building, the j-th kind of material is represented as $M_j$ (1≤j≤T), δt, δd, and δr are relation coefficients showing whether a wireless signal on the k-th path has transmission, diffraction and reflection relations with the building material, $$\delta t = \begin{cases} 0, \text{ when there is no transmission for the material } M_j \\ 1, \text{ when there is transmission for the material } M_j \end{cases},$$

$$\delta d = \begin{cases} 0, \text{ when there is no diffraction for the material } M_j \\ 1, \text{ when there is diffraction for the material } M_j \end{cases},$$

$$\delta r = \begin{cases} 0, \text{ when there is no reflection for the material } M_j \\ 1, \text{ when there is reflection for the material } M_j \end{cases},$$

$L_t(f, M_j)$, $L_d(f, M_j)$, and $L_r(f, M_j)$ are transmission, diffraction and reflection loss parameters of frequencies corresponding to the material $M_j$ found in a building material wireless propagation loss parameter database when the frequency of the wireless signal is f, respectively; then the sum $L_{MAT}(f)$ of declination of transmission, reflection and diffraction on the k-th path caused by the building material is calculated by the following formula:

$$L_{MAT}(f) = \sum_{j=1}^{T} (\delta t * L_t(f, M_j) + \delta d * L_d(f, M_j) + \delta r * L_r(f, M_j))$$

Figure 6:
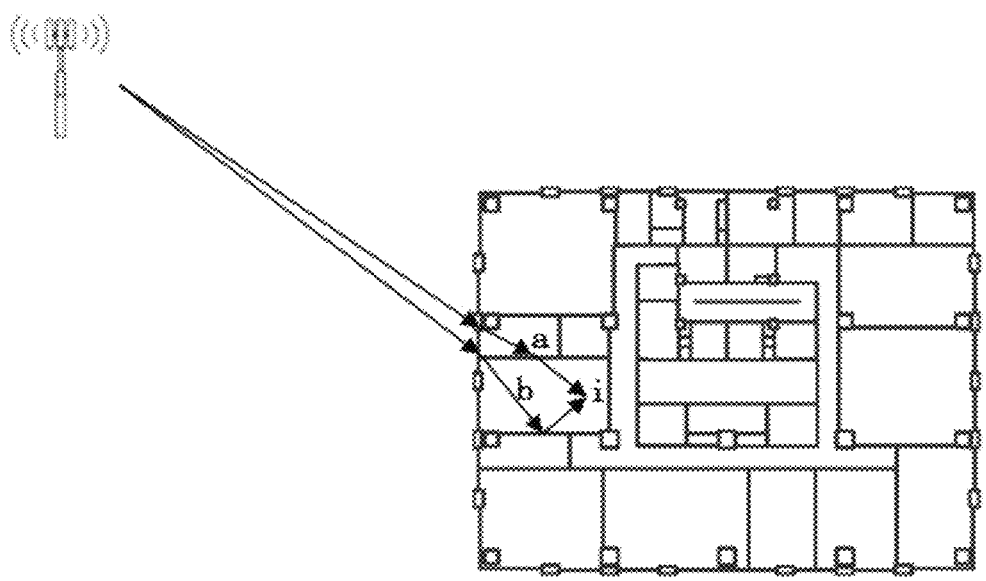
FIG. 6 shows a procedure of indoor virtual rays tracing calculation according to the invention.

It can be known according to FIG. 6 that the ray a is subjected to a penetration loss of a concrete wall for one time and to a penetration loss of a brick wall for one time, and the ray b is subjected to a penetration loss of a concrete wall for one time and to a reflection loss of a brick wall for one time, wherein the penetration loss of the concrete wall is 20.25 dB, the penetration loss of the brick wall is 6.77 dB, and the reflection loss parameter of the brick wall is 9.55 dB. Therefore, the losses caused by building materials are 27.02 dB and 29.8 dB respectively.

(4-4): calculating a propagation loss $L(f, d_k)$ of each virtual ray on the propagation path by the following formula:

$$L(f,d_k)=L_{out}^k-L_p(f,d_k)-L_{MAT}(f)$$

$$L(f,d_1)=130.01-56.31-27.02=213.34 \text{ dB},$$

$$L(f,d_2)=134.89-58.25-29.8=272.94 \text{ dB}.$$

(4-5): calculating the sum of losses of propagation paths of N rays reaching the i-th point as PL (dB); because the energy for the propagation path each ray is of a linear relationship, the losses of a plurality of propagation paths may be calculated by firstly superpositioning the energy (mW) of each ray, taking the average value, and then converting the energy value into a path loss value; said PL is calculated through the following formula:

$$PL = 10 \lg\left(\frac{1}{N}\sum_{k=1}^{N}\left(10^{\frac{L(f,d_k)}{10}}\right)\right).$$

The calculation result is PL=220.38 dB.

(4-6): wireless signal strength of the receiving point i is calculated, and assuming that $P_i$ is the signal strength (dBm) of the i-th receiving point; W is transmitting power (dBm) of a wireless signal transmitting antenna, then the signal strength $P_i$ of the i-th receiving point is calculated by the following formula:

$$P_i = W - PL$$

Calculation result is $P_i$=49.63−220.38=−170.75 dBm.

(4-7): other receiving points in the building are selected, and the steps (4-1) to (4-6) are repeated to calculate signal strength of each of these receiving points, so as to complete prediction of signal field strength of the indoor three-dimensional space of the target floor of the target building.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for predicting indoor three-dimensional space signal field strength using an outdoor-to-indoor propagation model, comprising specific steps of:
   step (1): establishing a three-dimensional space scene model from a transmitting base station to a target building, the modeling of the three-dimensional space scene model comprising: a three-dimensional scene model of outdoor buildings and streets and an indoor three-dimensional scene model of a target building, and the establishing comprising following steps (1-1) to (1-4):
   step (1-1): importing GIS map information according to given GIS map information to establish a three-dimensional scene model from a transmitting base station to a prediction region space, wherein the three-dimensional scene model comprises building vector information, terrain and landform information, and the building vector information is a building outer envelope model;
   step (1-2): importing a drawing in CAD format according to a given architectural drawing in CAD format of the target building to establish an indoor three-dimensional scene model of the target building, comprising size, location, structure of the target building and building material within the target building, and wireless propagation loss parameter data of the building material;
   step (1-3): according to specific location information of the target building, aligning the outer envelope model of the target building in the outdoor three-dimensional scene model in the step (1-1) with a detailed indoor building model, the aligning comprising specific steps of translating and rotating the indoor building model, so that the same building has consistent locations in a coordinate system of the indoor building model and a coordinate system of an outdoor building model;
   step (1-4): filtering out invalid building and street model information from the outdoor building model in the step (1-1) to obtain three-dimensional building model and street information of valid buildings within the scope of the transmitting base station and the target building, wherein the valid buildings are all buildings containing within a first Fresnel circle between a receiving point at one meter high outside the target building and the transmitting base station;
   the radius r of the first Fresnel circle is calculated by $$r = \sqrt{\frac{\lambda d_1 d_2}{d}},$$

wherein λ is the wavelength of an electromagnetic wave, d represents a distance from the transmitting base station to a receiving point, S represents an infinite plane that is perpendicular to a line connecting a transmitting point and the receiving point, $d_1$ and $d_2$ represent a distance between the transmitting base station and the plane S and a distance between the receiving point and the plane S respectively; the three-dimensional building model information includes building outer envelope information, building height information, and building geographical location information $h_{roof}$, and building geographical location information; and the street information includes street width information w and street geographical location information;
   step (2): predicting space field strength of an outer envelope of the target building according to an extended COST-231-Walfisch-Ikegami propagation model, comprising following steps (2-1) to (2-6):
   step (2-1): performing on-site measurement in accordance with a fixed resolution at the periphery of the target building, and recording measurement data that an antenna signal of the transmitting base station reaches the outer envelope located one meter high from the ground at the periphery of the target building, the outer envelope of the target building only including a side of the target building that is close to the transmitting base station, but not including a side of the target building that is far away from the transmitting base station; wherein, measurement data of one receiving point includes location information and wireless signal strength information of the receiving point, which is represented as (x, y, z, $M_{rx}$), wherein x is longitude information of the receiving point, y is latitude information of the receiving point, z is height information of the receiving point, and $M_{rx}$ is reception signal strength information of the receiving point;
   step (2-2): acquiring a vertical section between the transmitting base station and one receiving point of the outer envelope of the target building that is located one meter high from the ground in the step (2-1), and acquiring therefrom key parameters of the COST-231-Walfisch-Ikegami propagation model, wherein the key parameters include an average roof height $h_{roof}$, an average street width w, an average distance b between buildings, a height $h_{tx}$ of the base station, a height $h_{rx}$ of the receiving point, a transmitting power W of the base station, a frequency f of a transmitting signal of the base station, a distance d between the base station and the reception point, and an included angle φ between an incident direction of a direct wave of the base station and a direction of a street to which a testing point belongs;

calculating reception signal strength $T_{rx}$ of the receiving point according to a calculation formula of the COST-231-Walfisch-Ikegami propagation model; a method for calculating the reception signal strength of the receiving point using the COST-231-Walfisch-Ikegami propagation model comprises following steps (2-2-1) to (2-2-4):

step (2-2-1): calculating propagation losses of line-of-sight propagation and non line-of-sight propagation between the base station and the receiving point respectively, wherein the propagation loss $L_{blos}$ of the line-of-sight propagation is calculated in accordance with the step (2-2-2) and the propagation loss $L_{bNlos}$ of the non line-of-sight propagation is calculated in accordance with the step (2-2-3), therefore a propagation loss $L_b$ is represented as a following formula:

$$L_b = \begin{cases} L_{blos}, \text{ when there is line-of-sight propagation from} \\ \quad \text{a transmitting point to a receiving point} \\ L_{bNlos}, \text{ when there is non line-of-sight propagation from} \\ \quad \text{a transmitting point to a receiving point} \end{cases};$$

step (2-2-2): calculating a propagation loss according to the formula $L_{blos}=42.6+26lgd+20lgf$ when there is line-of-sight propagation between the base station and the receiving point, wherein $L_{blos}$ is a propagation loss of the line-of-sight propagation;

step (2-2-3): calculating a propagation loss according to a formula $L_{bNlos}=L_{bs}+L_{rts}+L_{msd}$ when there is non line-of-sight propagation between the base station and the receiving point, wherein $L_{bs}$ is a propagation loss of a free space, $L_{rts}$ is a diffraction and scattering loss from the roof to the street, $L_{msd}$ is a diffraction loss of multiple barriers, and the method of calculating $L_{bs}$, $L_{rts}$, and $L_{msd}$ comprises following steps (2-2-3-1) to (2-2-3-3):

step (2-2-3-1): in the step (2-2-3), $L_{bs}$ is calculated by a formula $L_{bs}=32.45+20lgd+20lgf$;

step (2-2-3-2): in the step (2-2-3), $L_{rts}$ is calculated by a following formula:

$$L_{rts} = \begin{cases} -16.9 - 10lgw + 10lgf + 20lg(h_{roof} - h_{rx}) + L_{ori}, \text{ when } h_{roof} > h_{rx} \\ 0, \text{ when } L_{rts} < 0 \end{cases}$$

wherein, $$L_{ori} = \begin{cases} -10 + 0.354\phi, & 0 \le \phi < 35 \\ 2.5 + 0.075 \times (\phi - 35), & 35 \le \phi < 55; \\ 4.0 - 0.114 \times (\phi - 35), & 55 \le \phi < 90 \end{cases}$$

step (2-2-3-3): in the step (2-2-3), $L_{msd}$ is calculated by a following formula:

$$L_{msd} = \begin{cases} L_{bsh} + K_a + K_d lgd + K_f lgf - 9lgb \\ 0, \text{ when } L_{msd} < 0 \end{cases}$$

wherein, $$L_{bsh} = \begin{cases} -18\ lg(1 + h_{tx} - h_{roof}), & h_{tx} > h_{roof} \\ 0, & \text{when } h_{tx} \le h_{roof} \end{cases}$$

$$K_a = \begin{cases} 54, & h_{tx} > h_{roof} \\ 54 - 0.8 \times (h_{tx} - h_{roof}), & d \le 0.5 \text{ km and } h_{tx} \le h_{roof} \\ 54 - 0.8 \times (h_{tx} - h_{roof}) \times \left(\dfrac{d}{0.5}\right), & d < 0.5 \text{ km and } h_{tx} \le h_{roof} \end{cases}$$

$$K_d = \begin{cases} 18, & h_{tx} > h_{roof} \\ 18 - 15\left(\dfrac{h_{tx} - h_{roof}}{h_{roof} - h_{rx}}\right), & h_{tx} \le h_{roof} \end{cases}$$

$$K_f = -4 + \begin{cases} 0.7 \times \left(\dfrac{f}{925} - 1\right), & \text{for a medium-sized city and the center of of a suburb having trees of a medium density} \\ 1.5 \times \left(\dfrac{f}{925} - 1\right), & \text{for the center of a big city} \end{cases}$$

step (2-2-4): when there is line-of-sight propagation between the transmitting point and the receiving point the reception signal field strength is $T_{los}=W-L_{blos}$, and when there is non line-of-sight propagation between the transmitting point and the receiving point the reception signal field strength is $T_{Nlos}=W-L_{bNlos}$, therefore signal field strength of the receiving point is represented as:

$$T_{rx} = \begin{cases} W - L_{blos} = T_{los}, \text{ when there is line-of-sight propagation} \\ \quad \text{from a transmitting point to a receiving point} \\ W - L_{bNlos} = T_{los}, \text{ when there is non line-of-sight propagation} \\ \quad \text{from a transmitting point to a receiving point} \end{cases};$$

step (2-3): calculating an error between a measured value and a predicted value $\Delta=M_{rx}-T_{rx}$ according to the actually measured field strength $M_{rx}$ and the calculated field strength $T_{rx}$ of the testing point, to correct the calculation formula of the COST-231-Walfisch-Ikegami propagation model of the measurement point:

wherein, a corrected value between the actually measured field strength $M_{rx}$ and the calculated field strength $T_{rx}$ includes a corrected value $\Delta_{los}$ of line-of-sight propagation and a corrected value $\Delta_{Nlos}$ of non line-of-sight propagation:

$$\Delta = M_{rx} - T_{rx} = \begin{cases} \Delta_{los} = M_{rx} - T_{los}, \text{ when there is line-of-sight propagation} \\ \quad \text{from a transmitting point to a receiving point} \\ \Delta_{Nlos} = M_{rx} - T_{Nlos}, \text{ when there is non line-of-sight propagation} \\ \quad \text{from a transmitting point to a receiving point} \end{cases};$$

step (2-4): acquiring a vertical section between the transmitting base station and the receiving point of an extended height $h_{rx}'$ of the measurement point, wherein the extend height $h_{rx}'$ is consistent with a height of a predicted floor of the target building, and filtering out therefrom buildings outside the first Fresnel circle between the transmitting point and the receiving point, to re-acquire the key parameters of the COST-231-Walfisch-Ikegami propagation model, and calculating the reception signal strength of the extend height $h_{rx}'$ of the measurement point according to the corrected COST-231-Walfisch-Ikegami propagation model; the calculating the reception signal strength of the extend height $h_{rx}'$ specifically comprises following steps (2-4-1) to (2-4-2):

step (2-4-1): acquiring a vertical section between the transmitting base station and the extended height $h_{rx}'$ of the measuring point, and filtering out therefrom buildings outside the first Fresnel circle between the transmitting point and the receiving point, the calculation method of the radius r of the first Fresnel circle is the same with that of the step (1-4), $$r = \sqrt{\frac{\lambda d_1 d_2}{d}},$$

wherein d represents a distance from the transmitting base station to the receiving point, S represents an infinite plane that is perpendicular to the line connecting the transmitting point and the receiving point, $d_1$ and $d_2$ represent distances between the transmitting base station and the plane S and between the receiving point and the plane S respectively, a first Fresnel radius is a radius of a circle that is formed by intersecting the plane S and a Fresnel ellipsoid;

step (2-4-2): re-acquiring the key parameters of the COST-231-Walfisch-Ikegami propagation model according to three-dimensional building and street information that is filtered out of the first Fresnel circle, calculating field strength $T_{rx}'$ of the receiving point using the formula stated in the step (2-2), and calculating a correction parameter $\Delta$ using the step (2-3) to correct the signal field strength of the receiving point, and the corrected field strength of the receiving point may be represented as $T_{rx}''=T_{rx}'+\Delta$;

step (2-5): changing the height $h_{rx}'$ within a height range of the predicted floor, repeating the step (2-4), and calculating reception signal strength of the receiving point at a target floor using the corrected COST-231-Walfisch-Ikegami propagation model:

applying a mirror principle extended model algorithm when the height of the predicted floor $h_{rx}'>h_{tx}$ and there is non line-of-sight propagation, and replacing the actual height $h_{rx}'$ with a mirror height $h_{rx}''$ when the COST-231-Walfishch-Ikegami propagation model formula is applied, wherein the mirror height conforms to a formula $$h_{rx}'' = \begin{cases} 2h_{tx} - h_{rx}', & \text{when } h_{rx}' > h_{tx} \\ h_{rx}', & \text{when } h_{rx}' \leq h_{tx} \end{cases};$$

step (2-6): changing a position of the receiving point, repeating the steps (2-2) to (2-5), calculating reception signal strength of all prediction points at the outside of the target floor, thereby obtaining predicted signal field strength on an outer envelope of the target floor of the target building;

step (3): generating, on the outer envelope of the target building, a series of outdoor-to-indoor virtual rays in accordance with a fixed resolution:

step (4): tracing a propagation procedure of the virtual rays using a ray tracing propagation model algorithm, and predicting three-dimensional space signal field strength within the target building:

predicting signal strength of an outdoor transmitting antenna received at one receiving point i within the target building using the ray tracing propagation model algorithm comprises following specific steps (4-1) to (4-6):

step (4-1): determining all propagation paths through which the virtual rays reach the receiving point i indoor according to propagation directions of the virtual rays and locations of outdoor receiving points generated in the step (3): N is the total number of the propagation paths through which the virtual rays reach the receiving point i, according to the calculation result in the step (2), initial field strengths for N virtual rays are respectively denoted as $T_{rx}^k (1 \leq k \leq N)$, a transmitting power of an outdoor base station is denoted as W, and outdoor propagation losses of the N virtual rays that reach the outer envelope of the target building from the base station are respectively denoted as $L_{out}^k = W - T_{rx}^k$ $(1 \leq k \leq N)$;

step (4-2): calculating a propagation loss of each propagation path in an indoor free space, wherein a loss value of the k-th path in the free space is $L_p(f, d_k)$ $(1 \leq k \leq N)$, f is the signal frequency (MHz), $d_k$ is a distance (km) that the k-th path transfers in the free space; without considering transmission, reflection and diffraction phenomena, the loss value (dB) of the k-th path in the free space is calculated by a following formula:

$$L_p(f,d_k)=20lgf+20lgd_k+32.45;$$

step (4-3): calculating a loss of each propagation path that is influenced by building materials, wherein $L_{MAT}(f)$ is the sum of declination of transmission, reflection and diffraction on the k-th path caused by the building materials; T is the total number of all building materials in the target building, the j-th kind of material is represented as $M_j$ $(1 \leq j \leq T)$, $\delta t$, $\delta d$, and $\delta r$ are relation coefficients showing whether a wireless signal on the k-th path has transmission, diffraction and reflection relations with the building material respectively, $$\delta t = \begin{cases} 0, & \text{when there is no transmission for the material } M_j \\ 1, & \text{when there is transmission for the material } M_j \end{cases},$$

$$\delta d = \begin{cases} 0, & \text{when there is no diffraction for the material } M_j \\ 1, & \text{when there is diffraction for the material } M_j \end{cases},$$

$$\delta r = \begin{cases} 0, & \text{when there is no reflection for the material } M_j \\ 1, & \text{when there is reflection for the material } M_j \end{cases},$$

$L_t(f, M_j)$, $L_d(f, M_j)$, and $L_r(f, M_j)$ are transmission, diffraction and reflection loss parameters of frequencies corresponding to the material $M_j$ found in a building material wireless propagation loss parameter database when the frequency of the wireless signal is f, respectively; then the sum $L_{MAT}(f)$ of declination of transmission, reflection and diffraction on the k-th path caused by the building material is calculated by a following formula:

$$L_{MAT}(f) = \sum_{j=1}^{T} (\delta t * L_t(f, M_j) + \delta d * L_d(f, M_j) + \delta r * L_r(f, M_j));$$

step (4-4): calculating a propagation loss $L(f, d_k)$ of each virtual ray on the propagation path using a following formula:

$$L(f,d_k)=L_{out}^k+L_p(f,d_k)+L_{MAT}(f);$$

step (4-5): calculating the sum of losses of propagation paths of N rays reaching the i-th point as PL (dB); because the energy for the propagation path of each ray is of a linear relationship, the losses of a plurality of propagation paths are calculated by firstly superpositioning the energy (mW) of each ray, taking the average value, and then converting the energy value into a path loss value; said PL is calculated by a following formula:

$$PL = 10\log\left(\frac{1}{N}\sum_{k=1}^{N}\left(10^{\frac{L(f,d_k)}{10}}\right)\right);$$

step (4-6): calculating wireless signal strength of the receiving point i, assuming that $P_i$ is the signal strength (dBm) of the i-th receiving point and W is transmitting power (dBm) of a wireless signal transmitting antenna, then the signal strength $P_i$ of the i-th receiving point is calculated by a following formula:

$$P_i=W-PL;$$

step (4-7): selecting other receiving points within the building, and repeating the steps (4-1) to (4-6) to calculate signal strength of each of these receiving points, thereby completing prediction of signal field strength of the indoor three-dimensional space of the target floor of the target building.

2. A method for predicting indoor three-dimensional space signal field strength using an outdoor-to-indoor propagation model, the method comprising:

establishing a three-dimensional space scene model from a transmitting base station to a target building;

predicting a space field strength of an outer envelope of the target building according to an extended COST-231-Walfisch-Ikegami propagation model, wherein predicting the space field strength comprises calculating an error between a measured value and a predicted value $\Delta=M_{rx}-T_{rx}$ according to an actually measured field strength $M_{rx}$ and a calculated field strength $T_{rx}$ for a test point, to correct the COST-231-Walfisch-Ikegami propagation model for the test point;

generating, on the outer envelope of the target building, a series of outdoor-to-indoor virtual rays in accordance with a certain resolution; and simulating a propagation procedure of the virtual rays using a ray tracing propagation model algorithm, and predicting three-dimensional space signal field strength within the target building.

3. A method for predicting indoor three-dimensional space signal field strength using an outdoor-to-indoor propagation model according to claim 2, the method further comprising acquiring a vertical section between the transmitting base station and a receiving point of an extended height $h_{rx}'$ of the test point, wherein the extend height $h_{rx}'$ is consistent with a height of a predicted floor of the target building, and filtering out therefrom buildings outside a first Fresnel circle between the transmitting point and the receiving point, to re-acquire the key parameters of the COST-231-Walfisch-Ikegami propagation model, and calculating the reception signal strength of the extend height $h_{rx}'$ of the test point according to the corrected COST-231-Walfisch-Ikegami propagation model.

* * * * *